US007288202B2

United States Patent
Maier

(10) Patent No.: US 7,288,202 B2
(45) Date of Patent: Oct. 30, 2007

(54) ROTARY SEPARATOR AND METHOD

(75) Inventor: William C. Maier, Almond, NY (US)

(73) Assignee: Dresser-Rand Company, Olean, NY (US)

( * ) Notice: Subject to any disclaimer, the term of this patent is extended or adjusted under 35 U.S.C. 154(b) by 224 days.

(21) Appl. No.: 10/983,980

(22) Filed: Nov. 8, 2004

(65) Prior Publication Data

US 2006/0096933 A1  May 11, 2006

(51) Int. Cl.
 B04B 5/08 (2006.01)
 B04B 9/06 (2006.01)
 B04C 5/04 (2006.01)
(52) U.S. Cl. .................. 210/784; 210/788; 210/97; 210/143; 210/380.1; 210/512.3; 494/49; 494/51; 494/74; 209/719; 96/155; 96/156; 95/271; 55/405; 55/459.1
(58) Field of Classification Search ............. 210/738, 210/784, 788, 97, 143, 380.1, 512.3; 494/49, 494/51, 74; 209/719; 96/155, 156; 95/241, 95/261, 271; 55/405, 459.1
See application file for complete search history.

(56) References Cited

U.S. PATENT DOCUMENTS 5,385,446 A  1/1995 Hays
5,525,034 A  6/1996 Hays
5,685,691 A  11/1997 Hays
5,750,040 A  5/1998 Hays

FOREIGN PATENT DOCUMENTS

WO  WO 00/74811 A1 * 12/2000

OTHER PUBLICATIONS

Bi-Phase Rotary Separator Turbine, Multiphase Power & Processing Technologies LLC Technical Literature (available at http://www.mpptech.com/techpp/pdfs/Bi-Phase.pdf), (undated).
Tri-Phase Rotary Separator Turbine, Multiphase Power & Processing Technologies LLC Technical Literature (available at http://www.mpptech.com/techpp/pdfs/Tri-Phase.pdf), (undated).
IRIS™ In-Line Rotary Separator/Scrubber, Multiphase Poewr & Processing Technologies LLC Technical Literature (available at http://www.mpptech.com/products/IRIS_Rev5.2PDF), (undated).
Testing of an In-Line Rotary Separator (IRIS™) at the Chevron F. Ramirez Gas Production Facility by Hank Rawlins and Frank Ting, Presented at 52nd Annual Laurance Reid Gas Conditioning Conference, The University of Oklahoma, Feb. 24-27, 2002.
Utilization of an Inline Rotary Separator as a Wet Gas Meter by V.C. Ting, Presented at the 19th North Sea Flow Measurement Workshop 2001.

(Continued)

Primary Examiner—David A. Reifsnyder
(74) Attorney, Agent, or Firm—Michael Best & Friedrich LLP

(57) ABSTRACT

A separator and method according to which substances having relatively high densities are separated from a pressurized flow stream.

99 Claims, 6 Drawing Sheets

OTHER PUBLICATIONS

Analysis of Results of a Rotary Separator Turbine on the Shell Ram Powell TLP by Greg Ross, Keith Oxley and Hank Rowlins, (undated).

Field Test Results of a Rotary Separator Turbine on the Ram/Powell TLP by C.H. Rawlins and G.D. Ross, presented at the 2001 Offshore Technology Conference in Houston, TX 4-30-5-3, 2001.

Two-Phase Flow Turbines in Oil and Gas Production and Processing by Geirmund Vislie and Simon RH Davies, (undated).

Further Developments of the Biphase Rotary Separator Turbine by Geirmund Vislie, Simon Davies and Lance Hays, (undated).

* cited by examiner

ROTARY SEPARATOR AND METHOD

FIELD OF THE INVENTION

The present invention relates in general to a separator and in particular to a rotary separator for separating solids, liquids and/or gases having relatively high densities from liquids and/or gases having relatively low densities in a pressurized flow stream.

BACKGROUND

A rotary separator may be used to separate substances having relatively high densities, such as liquids, from a pressurized flow stream, such as a natural gas flow stream. During the operation of a typical rotary separator, a vortical flow is developed in the process stream as it flows through a rotating drum. The fluid is subject to an inertial acceleration field, resulting in centrifugal forces directed radially outward towards the inner surface of the drum. The substances having relatively high densities in the vortical flow stream, such as liquids, are subject to the highest centrifugal forces. Thus, liquids present in the flow stream are centrifuged and captured against the inner surface of the drum, thereby radially separating the liquids (high-density substances) from the gas (low-density substances). As a result, a "clean" or substantially non-liquid-transporting gas flow stream exits axially from the drum and flows downstream of the rotary separator.

However, several problems may arise during the operation of a typical rotary separator. For example, a self-powered rotary separator, that is, a rotary separator in which the rotating drum is powered by the process flow stream, may have a limited liquid-handling capacity, and an appreciable amount of liquid in the flow stream may decrease the separation efficiency.

Another problem arises in connection with variations in the volumetric flow rate of the pressurized flow stream. Operation of a typical rotary separator at an off-design volumetric flow rate may result in either a decrease in the separation efficiency of the separator (in the case of a decreasing flow rate), or an increase in the pressure drop across the separator (in the case of an increasing flow rate).

Other operational problems include a decrease in the separation efficiency of the separator because of decreases in fluid velocities within the drum due to any static surfaces about which the drum rotates. Also, the rate of liquid drainage from the separator may be not be sufficient relative to the rate of separation of the liquid from the gas, possibly causing liquid to back up in the separator. Further, any changes in pressure in the flow stream may fatigue various components in the separator, such as bearing assemblies. Also, due to flow resistances associated with the rotating drum, a secondary flow stream of gas may be driven around the outside of the drum. Since the secondary flow stream has not undergone rotary separation in the drum, it may transport liquid which then may be reintroduced into the gas flow stream downstream of the drum. Thus, re-contaminated gas (or liquid-carrying gas) may be transported downstream of the separator, frustrating the purpose of the separator.

Therefore, what is needed is a separator and/or method that overcomes one or more of the above-described problems, among others.

BRIEF DESCRIPTION OF THE DRAWINGS

FIG. 3 is a sectional view of the separator of FIG. 2 taken along line 3-3.

DETAILED DESCRIPTION

Figure 1:
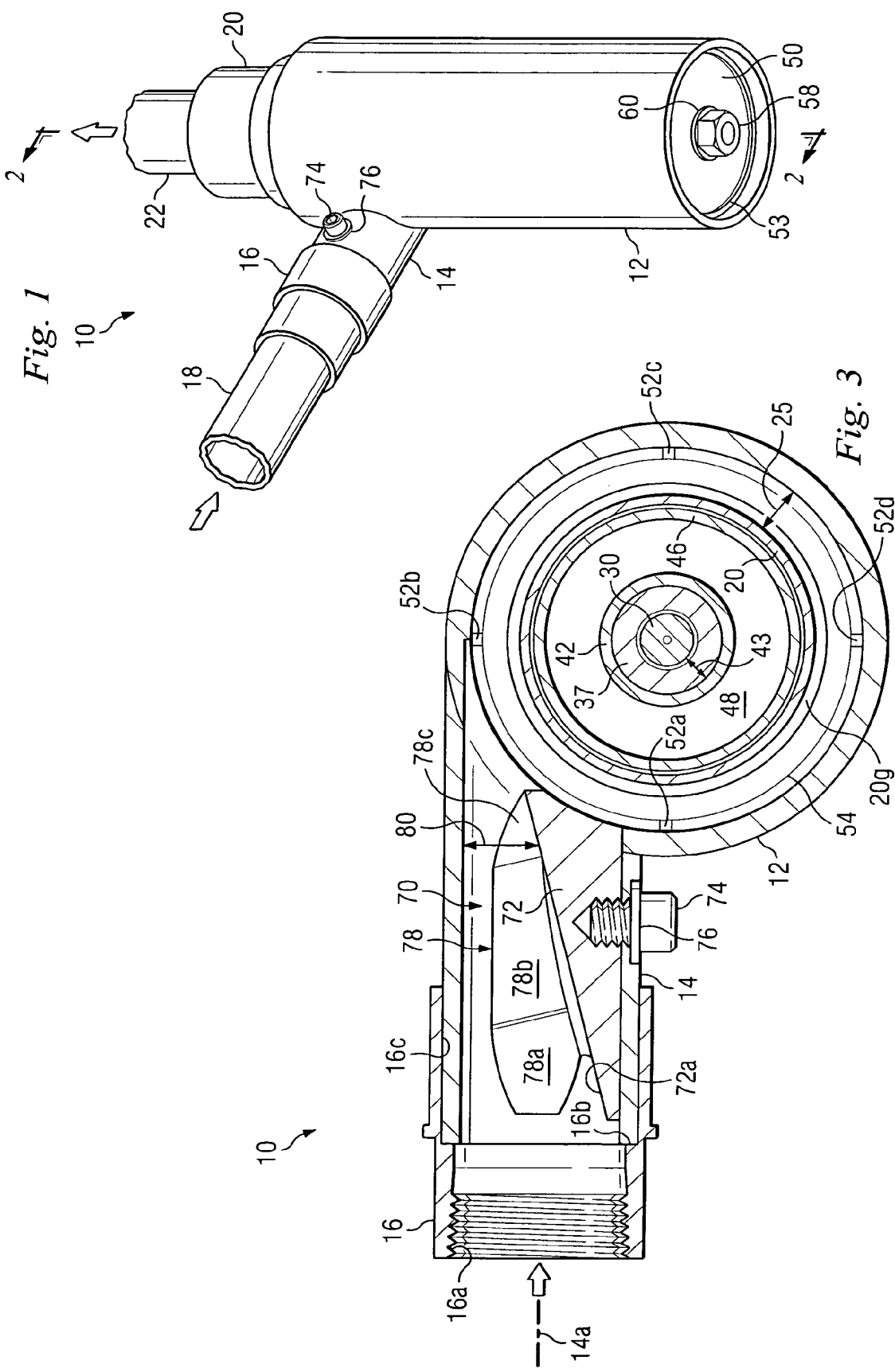
FIG. 1 is a perspective view of a separator according to an embodiment of the present invention.

Referring to FIG. 1, the reference numeral 10 refers, in general, to a separator 10 used to separate solids, liquids and/or gases having relatively high densities from a pressurized flow stream such as, for example, a natural gas flow stream. That is, the separator 10 separates solids, liquids and/or gases having relatively high densities from liquids and/or gases having relatively low densities in the pressurized flow stream, and removes the separated substances from the pressurized flow stream. For clarity purposes, the substances to be separated (or the substances with relatively high densities) will be referred to as "liquid(s)," whereas the substances with relatively low densities will be referred to as "gas."

The separator 10 includes a casing 12 in the form of an elongated tubular body member having a longitudinal axis. An inlet port 14, generally in the form of a tubular member, extends from the casing 12, and an inlet adapter 16 is connected to the inlet port. A pipe section 18 is connected to the adapter 16. A housing 20 extends into the casing 12, and a pipe section 22 is connected to the housing. The separator 10 is adapted for in-line pipe installation, and the pipe sections 18 and 22 are adapted to transport a pressurized flow stream to and away from the separator 10, respectively, as indicated by the flow arrows.

Figure 2:
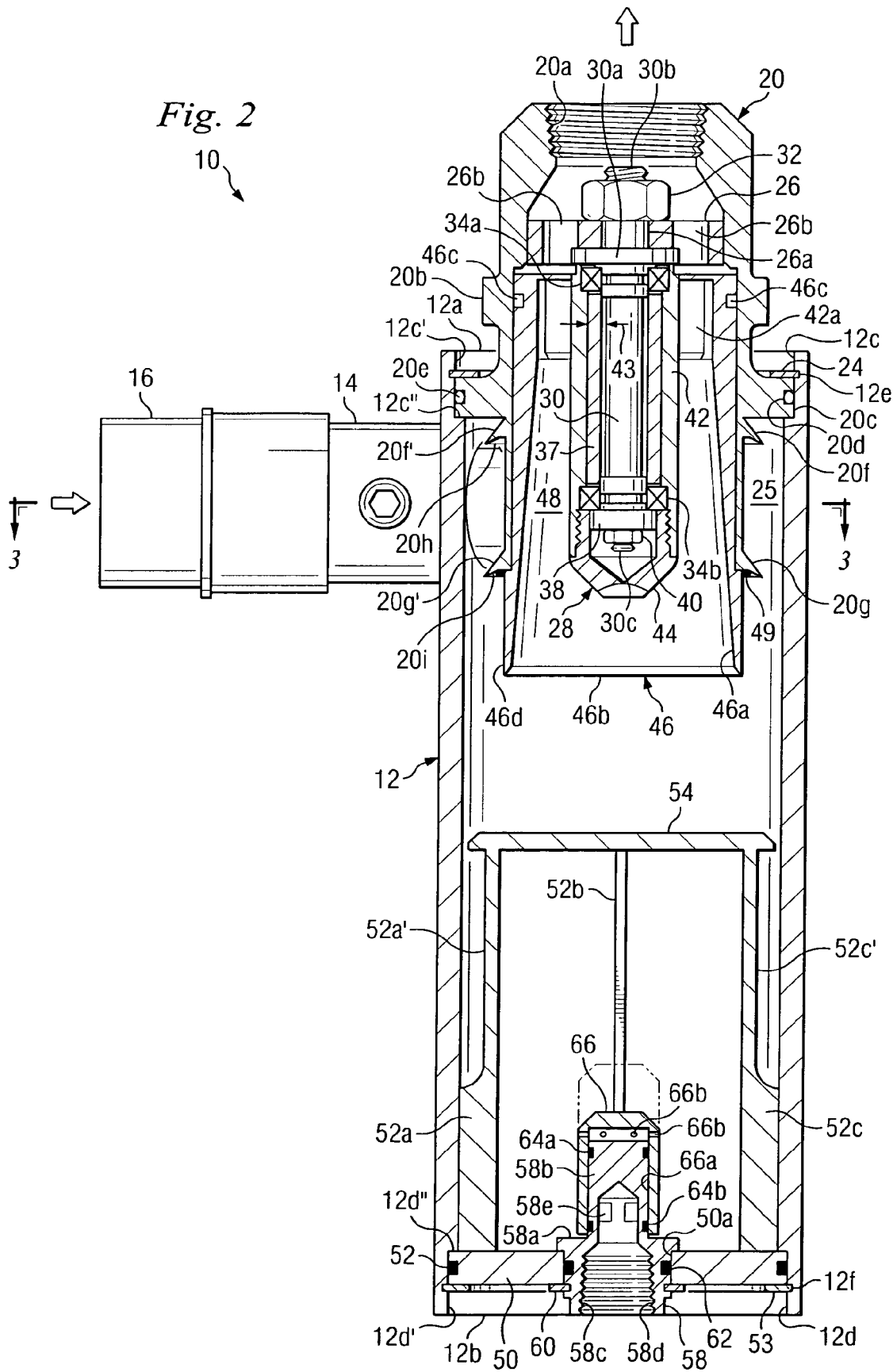
FIG. 2 is a sectional view of the separator of FIG. 1 taken along line 2-2.

Referring to FIG. 2, with continuing reference to FIG. 1, the casing 12 includes opposing ends 12a and 12b. A channel 12c is formed in the inner surface of the casing 12 and is adjacent to the end 12a, defining an inner surface 12c' and a radially-extending wall 12c''. Similarly, a channel 12d is formed in the inner surface of the casing 12 and is adjacent to the end 12b, defining an inner surface 12d' and a radially-extending wall 12d''. Circumferentially-extending grooves 12e and 12f are formed in the inner surfaces 12c' and 12d', respectively.

The housing 20, generally in the form of an elongated tubular member having variable inner and outer diameters, extends through the end 12a of the casing 12 so that a portion of the housing is disposed within the casing, and another portion of the housing is disposed outside of the casing and includes an internal-thread connection 20a via which the pipe section 22 is connected. Axially-spaced annular rings 20b and 20c extend around the housing 20. The annular ring 20c is slidably engaged with the inner surface 12c' of the channel 12c, and engages the radially-extending wall 12c''. A channel 20d is formed in the annular ring 20c and extends therearound. An o-ring 20e is disposed in the channel 20d and sealingly engages against the inner surface 12c' of the channel 12c. A retaining ring 24 is disposed within the groove 12e and engages the ring 20c, securing the housing 20 to the casing 12.

A pair of annular rings 20f and 20g extend around and radially outward from the outer surface of the housing 20. The rings 20f and 20g have generally triangular cross-sections, and surfaces 20f' and 20g', respectively, which extend at an acute angle from the outer surface of the housing 20 and in a direction opposite the internal-thread connection 20a. Channels 20h and 20i are formed in the rings 20f and 20g, respectively.

An annular region 25 is defined by the outer surface of the housing 20 and the inner surface of the casing 12. A support member 26 extends radially inward from an internal surface of the housing 20. A counterbore 26a extends axially through the center of the support member 26, and a plurality of bores 26b extend through the support member and are positioned circumferentially about the bore 26a.

A shaft assembly 28 includes a variable-diameter shaft 30 that extends through the counterbore 26a. An annular ring 30a circumferentially extends about the body of the shaft 30 and is disposed in the enlarged-diameter portion of the counterbore 26a. External-thread connections 30b and 30c extend axially from opposing ends of the shaft 30. A nut 32 is threadably engaged with the external-thread connection 30b, thereby clamping the ring 30a against a wall of the counterbore 26a and securing the shaft 30 to the support member 26. The shaft 30 extends through axially-spaced bearing assemblies 34a and 34b. A tubular member or sleeve 37 is disposed between the bearing assemblies 34a and 34b, and surrounds the corresponding portion of the shaft 30.

A disc member 38 having a bore engages the bearing assembly 34b, and the external-thread connection 30c is engaged with internal threads formed in the inner wall of the bore, clamping the disc member against the bearing assembly 34b. A nut 40 is threadably engaged with the external-thread connection 30c, thereby locking the disc member 38 in place to fix the correct pre-load on the bearing assembly 34b.

A rotor 42 engages the bearing assemblies 34a and 34b, and is disposed adjacent to the annular ring 30a. The rotor 42 is generally in the form of a tubular member and surrounds the sleeve 37, the disc member 38, the external-thread connection 30c, the nut 40 and the portion of the shaft 30 extending from the annular ring 30a to the external-thread connection 30c. A plurality of rotor blades 42a extends radially outward from the outer surface of the rotor 42.

An annular region 43 is defined by the inner surface of the rotor 42 and the outer surface of the shaft 30 so that the sleeve 37, by surrounding the shaft 30, is disposed in the annular region. An endcap 44 is threadably engaged with the end of the rotor 42 opposing the annular ring 30a, thereby enclosing the disc member 38, the external-thread connection 30c and the nut 40.

A drum 46 is connected to the distal ends of the rotor blades 42a. The drum 46 is generally in the form of a tubular member, axially extending into the housing 20 and circumferentially extending about the rotor 42 and the endcap 44. An annular region 47 (not shown) is defined by the outer surface of the drum 46 and inner surface of the housing 20.

A tapered inner surface 46a is defined by the drum 46 and extends from the rotor blades 42a to an inlet end 46b. An annular region 48 is defined by the outer surface of the rotor 42 and the inner surface 46a. A plurality of blind holes 46c are formed in the outer surface of the drum 46 at an axial location corresponding to the axial position of the annular ring 20b of the housing 20. An increased-diameter end portion 46d defines a wall that is disposed in the channel 20i. An annular labyrinth or drum seal 49 is disposed in and connected to the walls of the channel 20i, circumferentially extending about the increased-diameter end portion 46d. The seal 49 includes a plurality of protrusions extending radially inward and offset from the outer surface of increased-diameter end portion 46d.

A circular plate 50 is disposed in the channel 12d, contacting the surface 12d' and the wall 12d". A bore 50a is formed through the center of the plate 50. An o-ring 52 is disposed in an annular groove formed in the outer circumferential surface of the plate 50, and seals against the surface 12d'. A retaining ring 53 is disposed in the groove 12f and engages the plate 50, securing the plate to the casing 12.

Equally circumferentially-spaced blades 52a-52d are connected to the plate 50 and extend axially towards the housing 20 and the drum 46 (the blade 52d is not shown in FIG. 2). Elongated notches 52a'-52d' are formed in the blades 52a-52d, respectively, defining distal end portions of the blades that are appreciably offset from the inner surface of the casing 12. A generally circular plate 54, having its circumferentially-extending outer surface tapered away from the drum 46, is connected to the distal ends of the blades 52a-52d.

A valve insert 58 extends through the bore 50a, and includes a flange 58a that contacts a side of the plate 50. A retaining ring 60 is disposed in an annular groove formed in the outer surface of the valve insert 58, and contacts the side of the plate 50 opposing the side in contact with the flange 58a, thereby securing the valve insert 58 to the plate 50. An o-ring 62 is disposed in an annular groove formed in the outer surface of the valve insert 58, and seals against the inner wall of the bore 50a.

A cylindrical protrusion 58b extends axially from the flange 58a in a direction towards the housing 20 and the drum 46. A variable-diameter bore 58c is formed through the end of the valve insert 58 opposing the protrusion 58b. An internal-thread connection 58d is formed in the enlarged-diameter portion of the bore 58c. A drain line (not shown) is connected to the valve inset 58 via the internal-thread connection 58d. A plurality of ports 58e are formed through the protrusion 58b, extending radially outward from the wall of the reduced-diameter portion of the bore 58c. Axially-spaced o-rings 64a and 64b are disposed in annular grooves formed in the outer surface of the protrusion 58b.

A valve sleeve 66 having a blind bore 66a is slidably engaged with the protrusion 58b so that the bore receives the protrusion. A plurality of ports 66b are formed through the wall of the sleeve 66, extending radially outward from the inner surface of the bore 66a. The o-rings 64a and 64b sealingly engage the inner wall of the bore 66a. A float assembly (not shown) is connected to the valve sleeve 66. The float assembly is conventional and, as such, may include a float connected to the valve sleeve 66.

Figure 4:
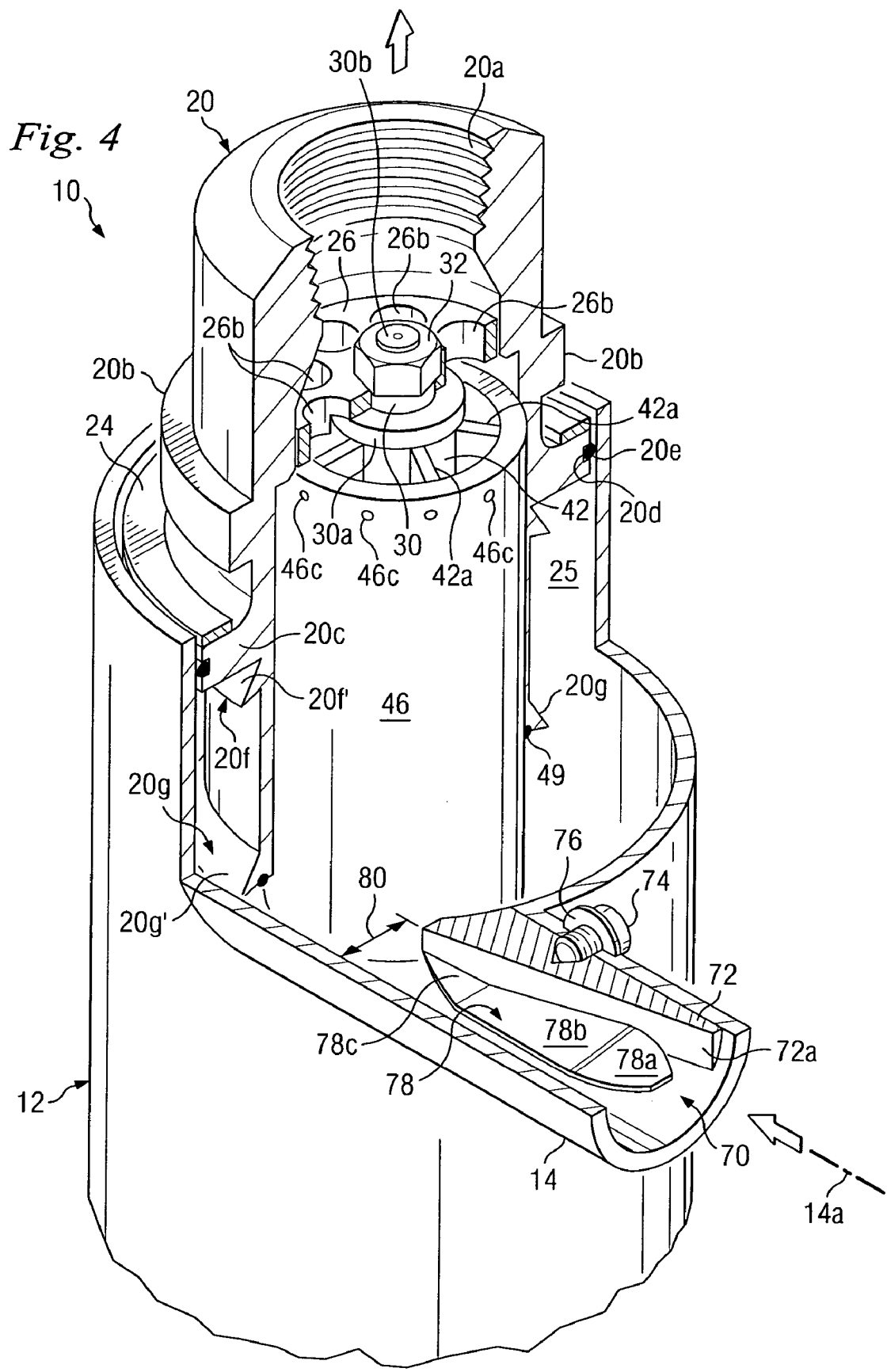
FIG. 4 is a partial perspective/partial sectional view of a portion of the separator of FIG. 1.

Referring to FIGS. 3-4, with continuing reference to FIGS. 1-2, the inlet adapter 16 is generally in the form of a tubular member and includes an internal-thread connection 16a, to which the pipe section 18 is threadably engaged. A circumferentially-extending shoulder 16b is formed in the inner wall of the adapter 16, defining a cavity 16c into which the inlet port 14 is received so that the distal end of the inlet port engages the shoulder. The inner wall of the cavity 16c may be attached to the outer wall of the inlet port in any conventional manner such as, for example, by coating the walls with polyvinylchloride (PVC) clear cement or another appropriate adhesive, or by using mechanical fasteners.

The inlet port 14 is generally in the form of a tubular member having a longitudinal center axis 14a, and is connected to the casing 12 so that the longitudinal center axis is substantially oriented perpendicular to and offset from the longitudinal axis of the casing, and so that a portion of the outer wall of the inlet port is tangentially aligned with a portion of the outer wall of the casing, as shown in FIG. 3.

A substantially prismatic tangential nozzle 70 is disposed within the inlet port 14, being formed on one side by the inner wall of the inlet port 14, and on the opposing side by a prismatic ramp surface 72a of a nozzle insert 72. As viewed in FIG. 3, surface 72a of the insert 72 extends in an angular direction so that the vertical distance between the surface 72a and the opposing inner surface of the inlet port 14 decreases as the surface 72a extends towards the casing 12. The perpendicular sides of the tangential nozzle are formed by two parallel surfaces 78b and 78b' (not shown) of the nozzle insert 72. Edges of the nozzle insert 72 at the inlet and discharge side, with respect to the process flow are tapered back to the inner surface of the inlet port 14 and rounded off to maximize the efficiency of the tangential nozzle 70. These tapers form surfaces 78a and 78c, between which the surface 78b is disposed, and opposing surfaces 78a' and 78c' (not shown), between which the surface 78b' is disposed. The resulting nozzle 70 is thus a smoothly converging passage.

The insert 72 engages the inner surface of the inlet port 14 via a fastener 74. A sealing washer 76 is disposed in a recess formed in the outer wall of the inlet port 14, and sealingly engages the head of the fastener 74 and the vertical wall of the recess. A nozzle throat area 80 is defined by the minimum cross-sectional area of nozzle 70, perpendicular to the direction of the process flow stream and occurring in the region adjacent to the surface 78c.

In operation, with continuing reference to FIGS. 1-4, the gas flow stream enters the inlet port 14, and subsequently the separator 10, via the pipe section 18 and the adapter 16. The gas flow stream enters the inlet port 14 at an operating flow pressure and an operating volumetric flow rate. It is understood that bulk and/or entrained liquids are present in the pressurized gas flow stream upon entry into inlet port 14 and that it is desired to separate the liquids from the flow stream via the separator 10. Thus, the flow stream is cleaned or "scrubbed" by the separator 10, and clean gas (or non-liquid-transporting gas) flows downstream of the separator 10 via the pipe section 22.

As the gas flows into the inlet port 14 and then through the tangential nozzle 70, it is accelerated by the reduction in flow area to a peak velocity at the nozzle throat area 80. The flow stream then enters the annular region 25 in a direction substantially perpendicular to the longitudinal axis of the casing 12. As this high velocity flow is forced to curve around the longitudinal axis of the casing 12 by the curvature of the casing inner wall, a swirling vortical flow regime is established. As the gas swirls around the outer surface of the housing 20 in the annular region 25, the gas is prevented from traveling axially in a direction towards the pipe section 22 by the annular ring 20c. The o-ring 20e prevents the gas from leaking out into the atmosphere from between the casing 12 and the annular ring 20c.

Thus, due to the initial swirl generation, the gas travels in the annular region 25 in an axial direction towards the inlet end 46b of the drum 46 in the form of a vortical flow stream, and between two static surfaces, the outer surface of the housing 20 and the inner surface of the casing 12.

During this time, bulk separation of liquid from the gas in the gas flow stream occurs. The vortical flow stream creates a centrifugal force field in the annular region 25. That is, the vortical flow stream creates a circumferentially-extending array of effective centrifugal forces on the swirling flow that are directed radially outward towards the inner surface of the casing 12. Because the rate of radial movement of the fluid particles is directly related to their size and density, the greatest effect is on the bulk liquid in the gas flow stream, that is, the relatively large liquid droplets in the gas flow stream. Thus, the bulk liquid is preferentially centrifuged or "forced" against the inner surface of the casing 12, thereby separating from the gas.

The resulting buildup of continually centrifuged bulk liquid on the inner surface of the casing 12 in concert with the induced centrifugal force field compels the liquid to flow downward, along the inner surface of the casing, and towards the plate 50. The bulk liquid is then drained from the casing 12 in a manner to be described. It is understood that any pressure differentials in the vicinity of the inner surface of the casing 12, and/or along the longitudinal length of the casing, may also promote the flowing of the bulk liquid along the inner surface. Furthermore, due to the vertical orientation of the casing 12, it is understood that gravity will also promote the flowing of the bulk liquid along the inner surface of the casing 12 and towards the plate 50.

As described above, the vortical flow stream in the annular region 25 travels axially towards the inlet end 46b of the drum 46, and enters the region of the casing 12 between the plate 54 and the drum 46. At this point, the flow is re-directed upward in a reverse axial direction and enters the drum 46. Because of the reduction in radius at this point, the swirl velocity in the flow stream increases further, thus enhancing the centrifugal forces on the fluid. It is understood that a relatively small portion of this flow stream may instead flow around the outside of the drum 46 and into the annular region 47 (not shown). The seal 49 resists and limits the amount of gas that flows into the annular region 47.

The flow stream entering the drum 46 and the annular region 48 continues to swirl and be subject to induced centrifugal forces, preferentially centrifuging denser components to the inner surface 46a of the drum 46, and thereby separating the liquids (high-density substances) from the gas (low-density substances).

As a result of the vortical flow stream, and due to the combination of viscous drag on the inner surface of the drum 46 and momentum transfer from the vortical flow stream to the blades 42a, the drum and the blades rotate clockwise, as viewed in FIG. 3. The rotor 42 and the endcap 44 rotate along with the rotation of the drum 46 and the blades 42a, with the bearing assemblies 34a and 34b supporting the rotating rotor 42. The shaft 30, in turn, supports the bearing assemblies 34a and 34b. The shaft 30, the sleeve 37, the disc member 38 and the nut 40 remain stationary as the rotor 42 rotates about the shaft. Thus, the drum 46 is powered by the pressurized gas flow stream entering the separator 10.

The rotation of the drum 46 provides continual centrifugal forces that are directed radially outward, causing the entrained liquid to remain on or "stick" against the inner surface of the rotating drum, and separate from the gas. Since both the drum 46 and the rotor 42 rotate, the vortical flow stream in the annular region 48 is bounded by the rotating inner surface of the drum and the rotating outer surface of the rotor. As a result of the rotating outer surface of the rotor 42, the velocity of the vortical flow stream is higher and the centrifugal forces are greater than if the outer surface of the rotor was static, thus improving the separation of liquid from the gas in the annular region 48.

Further, an appreciable fluid shear boundary is not formed at the inner surface of the drum 46 because the drum 46, the rotor 42 and the vortical flow stream are moving at approximately the same rotational speed, thereby promoting the formation of a circumferentially-extending, smooth and distinct liquid layer on the inner surface of the drum.

Due to the above-described bulk-liquid-separation process, the drum 46 only experiences relatively low liquid loading. That is, bulk liquids are substantially not present in the vortical flow stream entering the drum 46 and the annular region 48. Since the rotational speed of the drum 46 is a function of, inter alia, the amount of liquid in the gas flow stream (the greater the amount of liquid, the lower the rotational speed), a relatively high rotational speed of the drum is maintained because of the substantial absence of bulk liquid entering the drum. Thus, due to the bulk-liquid-separation process, the rotational speed of the drum 46 is substantially decoupled from, or no longer a substantial function of, the amount of liquid in the gas flow stream upstream of the separator 10, that is, the liquid flowing through the pipe section 18.

The rotation of the drum 46, along with the tapered profile of the inner surface 46a of the drum, also forces the entrained liquid on the inner surface to flow towards the inlet end 46b of the drum. Upon reaching the inlet end 46b, the liquid discharges radially outward from the end and is flung towards the inner surface of the casing 12. The discharged liquid either is carried by the portion of the vortical flow stream flowing downward beyond the plate 54, or impacts the inner surface of the casing 12 and joins with the already-separated bulk liquid to flow along the inner surface and drain from the casing in a manner to be described. Furthermore, due to the vertical orientation of the casing 12, it is understood that gravity may also promote the discharge of the liquid from the drum 46.

As indicated above, the region in the casing 12 below the plate 54 has no gas through-flow, and only some minor secondary flows. The liquid film draining down the inside of the casing 12 passes through the narrow gap formed between the outer cylindrical edge of the plate 54 and the inner surface of the casing 12. Initially, the liquids are still swirling at close to the swirl velocity of the main process flow stream. As it continues its downward movement, the liquid film contacts the distal end portions of the blades 52a-52d, which present drag surfaces, decreasing the rotational velocity of the liquids. As the liquid flows axially past the notches 52a'-52d', the proximal end portions of the blades 52a-52d present relatively high drag surfaces, further decreasing the rotational velocity of any vortical properties of the flow stream and substantially stopping any swirling motion in the vicinity of the valve sleeve 66. Thus, the plate 54 and the blades 52a-52d substantially limit the amount of swirl below the plate, contributing to the overall cessation of the vortical flow regime below the plate.

As discussed above, liquid flows downward along the inner surface of the casing 12 due to both bulk-liquid separation and liquid discharge from the drum 46. The liquid coalesces and collects on the plate 50 at the bottom of the casing 12. By limiting vortical flow below the plate 54, it is understood that the plate 54 and the blades 52a-52d may also promote liquid collection on the plate 50. It is further understood that the plate 54 and the blades 52a-52d may enable additional liquid in the flow stream to "stick" to the blades and/or the inner surface of the casing 12, and flow downwards therealong for collection on the plate 50.

As more liquid collects on the plate 50, a pool of liquid forms at the bottom of the casing 12, extending across the plate and having a rising liquid level. As the liquid level rises, the float (not shown) connected to the valve sleeve 66 also rises, causing the valve sleeve to slide upwards along the valve insert 58. The valve sleeve 66 continues to rise until the sleeve passes at least a portion of the ports 58e, thereby exposing at least a portion of the ports to the liquid. The liquid in the casing 12 flows through the ports 58e and into the bore 58c, draining from the casing via the drain line connected to the valve insert 58 (drain line not shown).

As liquid drains from the casing 12 in the above manner, the liquid level of the pool in the casing decreases which, in turn, causes the valve sleeve 66 to slide downwards until the sleeve covers the ports 58e and liquid flow through the ports ceases. Any liquid within the sleeve 66, and disposed between the distal end of the protrusion 58b and the inner surface of the sleeve, exits the sleeve via the ports 66b to enable the sleeve to slide downward towards the plate 50. The o-rings 64a and 64b sealingly engage the inner wall of the sleeve 66, preventing unwanted leakage when there is no liquid flowing into the separator 10. The above-described process is repeated as additional liquid collects in the vicinity of the valve insert 58.

If the amount of liquid in the gas flow stream in the pipe section 18 increases, the amount of liquid being collected at the bottom of the casing 12 will also increase. As a result, the rate of liquid drainage from the separator 10 will increase because the sleeve 66 will slide higher along the protrusion 58b, exposing more of the ports 58e. Conversely, if the amount of liquid in the gas flow stream in the pipe section 18 decreases, the amount of liquid being collected at the bottom of the casing 12 will also decrease. As a result, the rate of liquid drainage from the separator 10 will also decrease because the sleeve 66 will slide lower along the insert 58, exposing less of the ports 58e. Thus, at any particular moment, the rate of liquid drainage substantially corresponds to the amount of liquid separated from the gas flow stream.

Further, it is understood that a liquid pressure seal is always maintained between the bore 58c of the insert 58, and the region of the interior of the casing 12 above the liquid level of the collected liquid at the bottom of the casing. That is, during the above-described drainage process, the exposed portions of the ports 58e are always submerged in the collected liquid at the bottom of the casing 12, thereby maintaining the pressure in the interior of the casing above the liquid level of the collected liquid.

In view of the foregoing, it is understood that the casing 12 is substantially divided into two regions—a high-swirl separation region above the plate 54, and a low or no-swirl drainage region below the plate. As a result of the above-described separation and drainage, clean gas in the gas flow stream (or non-liquid-transporting gas) exits the drum 46 and flows through the bores 26b of the support member 26. It is understood that the bores 26b may assist in uniformly distributing the flow stream, and minimizing the exit swirl present in the flow stream. The clean gas flows downstream of the separator 10 via the pipe section 22.

During the initial pressurization of the separator 10, and/or during an increase in the operating flow pressure of the flow stream in the pipe section 18, it is understood that at least some gas flows into the annular region 43. This gas may reach the annular region 43 by flowing across the bearing assemblies 34a and 34b. The presence of the sleeve 37 minimizes the amount of gas volume in the annular region 43, thereby minimizing the amount of fluid that flows across the bearing assemblies 34*a* and 34*b* during the initial pressurization of the separator 10 and/or during the increase in the operating pressure of the flow stream. This decrease in the amount of fluid flowing into the annular region 43 promotes the maintenance of the integrity of the connections between the bearing assemblies 34*a* and 34*b* and the shaft 30, between the bearing assemblies and the rotor 42, and between the other above-described mechanical connections in the shaft assembly 28. Also, the decrease in fluid flow across the bearing assemblies 34*a* and 34*b* limits contamination of said bearing assemblies.

During normal operation of the separator 10, it is understood that the operating flow pressure of the flow stream in the pipe section 18 may decrease. As a result, it is further understood that the separator 10 may de-pressurize, causing gas to flow out of the annular region 43 and across the bearing assemblies 34*a* and 34*b*. By minimizing the amount of gas volume in the annular region 43, the sleeve 37 may minimize the amount of fluid that flows across the bearing assemblies 34*a* and 34*b*, thereby continuing to promote the maintenance of the integrity of the mechanical connections in the shaft assembly 28, and the integrity of the shaft-assembly components themselves. Thus, the sleeve 37 minimizes the "breathing" of the shaft assembly 28, that is, the amount of fluid which flows to and from the annular region 43 and across the bearing assemblies 34*a* and 34*b*.

Figure 5:
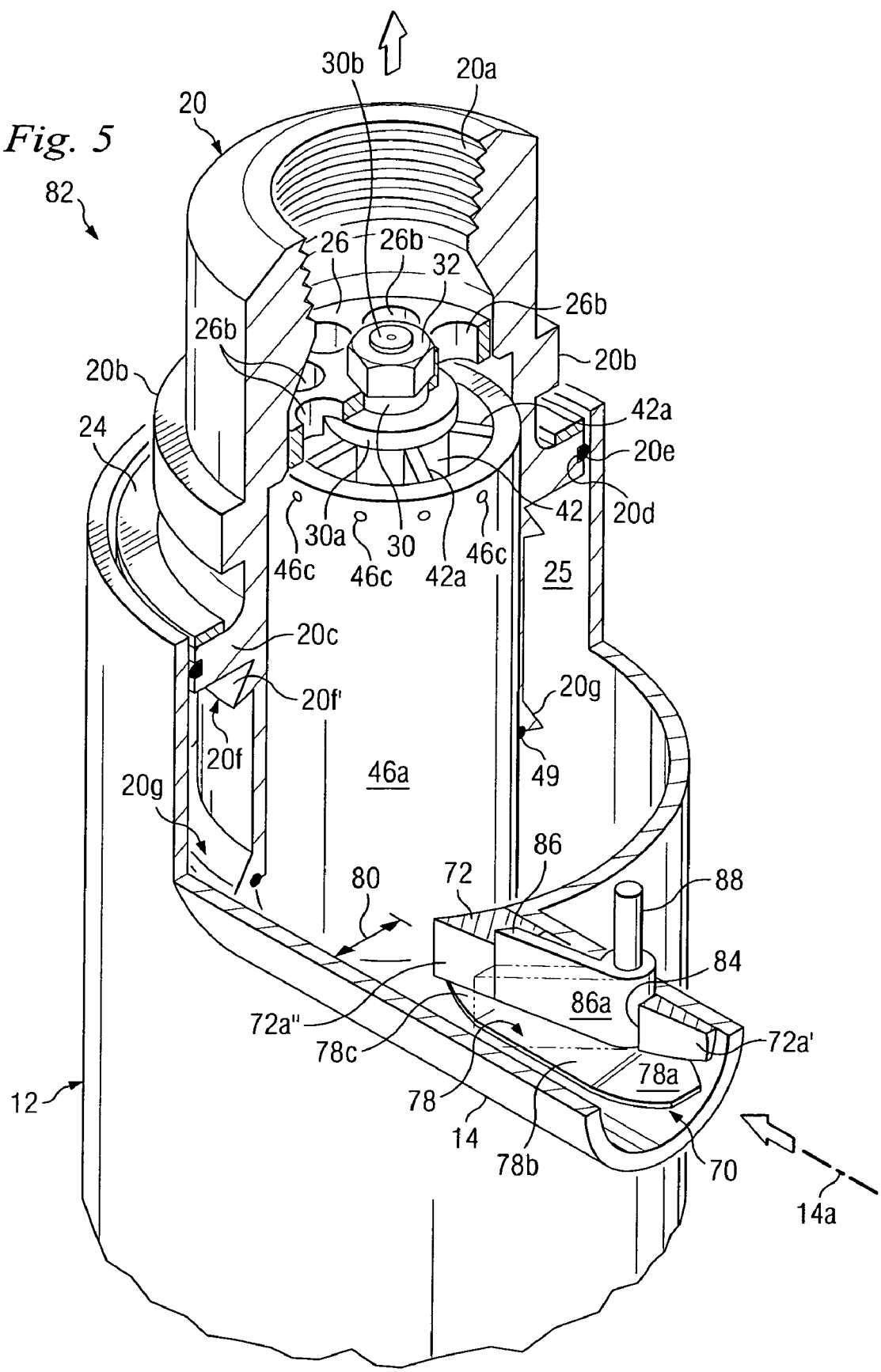
FIG. 5 is a view similar to that of FIG. 4 but depicting a separator according to another embodiment of the present invention.

Referring to FIG. 5, another embodiment of a separator is generally referred to by the reference numeral 82, and is similar to that of FIGS. 1-4 and contains several parts of the embodiment which are given the same reference numerals. In the embodiment of FIG. 5, a cavity 84 is formed in the surface 72*a* of the insert 72, separating the surface into two regions, 72*a*' and 72*a*". The distance between the two regions 72*a*' and 72*a*" substantially corresponds to the length of the panel 78*b*. A plate 86 is disposed in the cavity 84 so that a surface 86*a* of the plate is substantially flush with the surface regions 72*a*' and 72*a*".

A shaft 88 is connected to the plate 86 so that the shaft is substantially perpendicular to the longitudinal axis 14*a*. It is understood that the shaft extends through an opening formed in the wall of the inlet port 14 (not shown) and out of the separator 10, and that a conventional seal (not shown) surrounds the shaft 88 at the opening to sealingly engage both the outer surface of the shaft and the inlet port. The shaft 88 is adapted to rotate in place under conditions to be described. To accommodate the plate 86 and the shaft 88, it is understood that the fastener 74 and the sealing washer 76 may be removed from the inlet portion 14, and that the insert 72 may be secured to the inner surface of the inlet port via other conventional means such as, for example, adhesive or other mechanical fasteners (not shown).

In operation, the separator 82 operates generally in a manner similar to that of the separator 10 of the embodiment of FIGS. 1-4. As shown in FIG. 5, the plate 86 may be in a "full open" position, that is, the plate may be substantially flush with the surface regions 72*a*' and 72*a*".

When the volumetric flow rate of the gas flow stream in the pipe section 18 decreases, the velocity of the vortical flow stream in the casing 12 during the bulk-liquid separation process may decrease. Since the bulk-liquid-separation efficiency is dependent upon the velocity of the vortical flow stream swirling around the housing 20, less bulk liquid separation will occur.

Similarly, when the volumetric flow rate of the gas flow stream decreases in the pipe section 18, the velocity of the vortical flow stream entering the drum 46 may also decrease. As a result, the separation efficiency of the drum 46 may decrease because the separation efficiency of the drum is dependent upon the velocity of the vortical flow stream entering the drum.

The shaft 88 is rotated counterclockwise, as viewed in FIG. 5, so that the plate 86 also rotates counterclockwise. Rotation is stopped when the plate is at a predetermined position, relative to the portion of the wall of the inlet port 14 that opposes the surface regions 72*a*' and 72*a*". At this point, the nozzle throat area 80 has decreased and the panels 78*a* and 78*b*, the surface region 72*a*' and the surface 86*a* form a smoothly converging nozzle.

As a result of the decrease in the nozzle throat area 80, the velocity of the gas flow stream flowing over the surface 86*a* increases, thereby increasing the velocity of the vortical flow streams in the casing 12, that is, both the vortical flow stream corresponding to the bulk-liquid separation, and the reverse-axial vortical flow stream entering the drum 46. The increasing velocity of the vortical flow stream swirling around the housing 20 returns the vortical flow stream in the annular region 25 to its normal operating velocity distribution, and returns the separator 10 to its normal bulk-liquid-separation efficiency level. Similarly, the increasing velocity of the vortical flow stream entering the drum 46 returns the vortical flow stream in the annular region 48 to its normal operating velocity distribution, and returns the drum to its normal separation-efficiency level. Therefore, adequate liquid separation by the separator 10 is ensured, notwithstanding the decrease in the volumetric flow rate of the gas flow stream in the pipe section 18.

When the volumetric flow rate of the gas flow stream in the pipe section 18 increases, the pressure drop across the separator 10 increases. It is understood that it may be desired to eliminate this increase in the pressure drop across the separator 10. To this end, the shaft 88 is rotated clockwise, as viewed in FIG. 5, so that the plate 86 also rotates clockwise. Rotation is stopped when the plate is at a predetermined position, relative to the portion of the wall of the inlet port 14 that opposes the surface regions 72*a*' and 72*a*". At this point, the nozzle throat area 80 has increased and the panels 78*a* and 78*b*, the surface region 72*a*' and the surface 86*a* continue to form a converging nozzle.

As a result of the increase in the nozzle throat area 80, the velocity of the gas flow stream flowing over the surface 86*a* decreases, thereby returning the vortical flow streams in the annular regions 25 and 48 to their normal operating velocity distributions, and decreasing the pressure drop across the separator 10. Therefore, the pressure drop across the separator 10 may be maintained at a constant level, notwithstanding the increase in the volumetric flow rate of the gas flow stream in the pipe section 18.

In view of the foregoing, it is understood that the nozzle throat area 80 may be continuously varied by rotating the shaft 88, decreasing or increasing the nozzle throat area in response to any decrease or increase, respectively, of the volumetric flow rate of the gas flow stream in the pipe section 18, thereby maintaining as substantially constant the velocity distribution of the flow stream in the annular region 48. It is understood that the insert 72, the panels 78*a*-78*c*, the plate 86 and the corresponding range of variation in the nozzle-throat area 80 may be configured so that separator 10 may accommodate various orders of reductions in the volumetric flow rate of the gas flow stream such as, for example, reductions on the order of 10 to 1.

Figure 6:
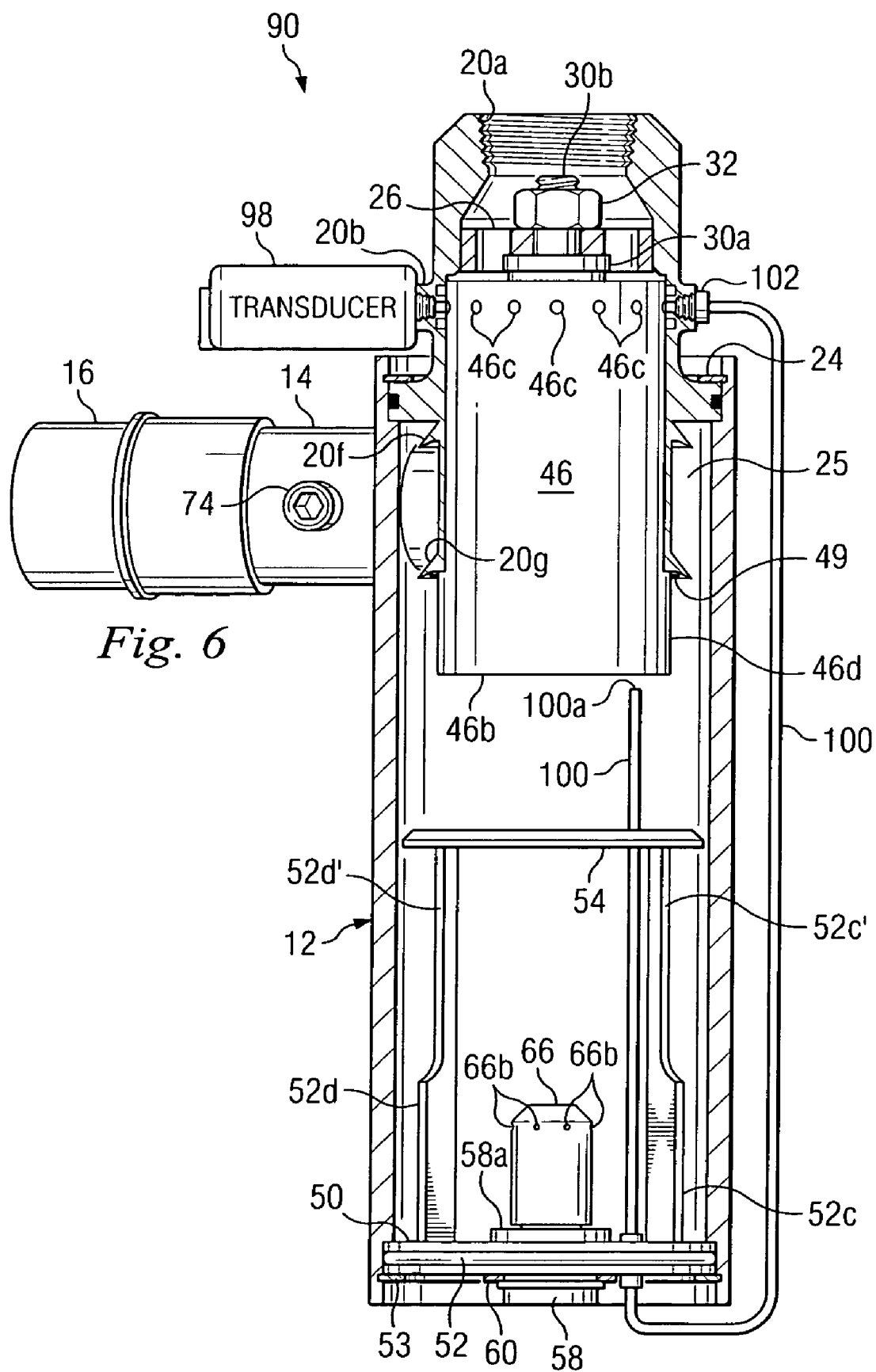
FIG. 6 is a partial elevational/partial sectional view similar to that of FIG. 2 but depicting a separator according to yet another embodiment of the present invention.
Figure 7:
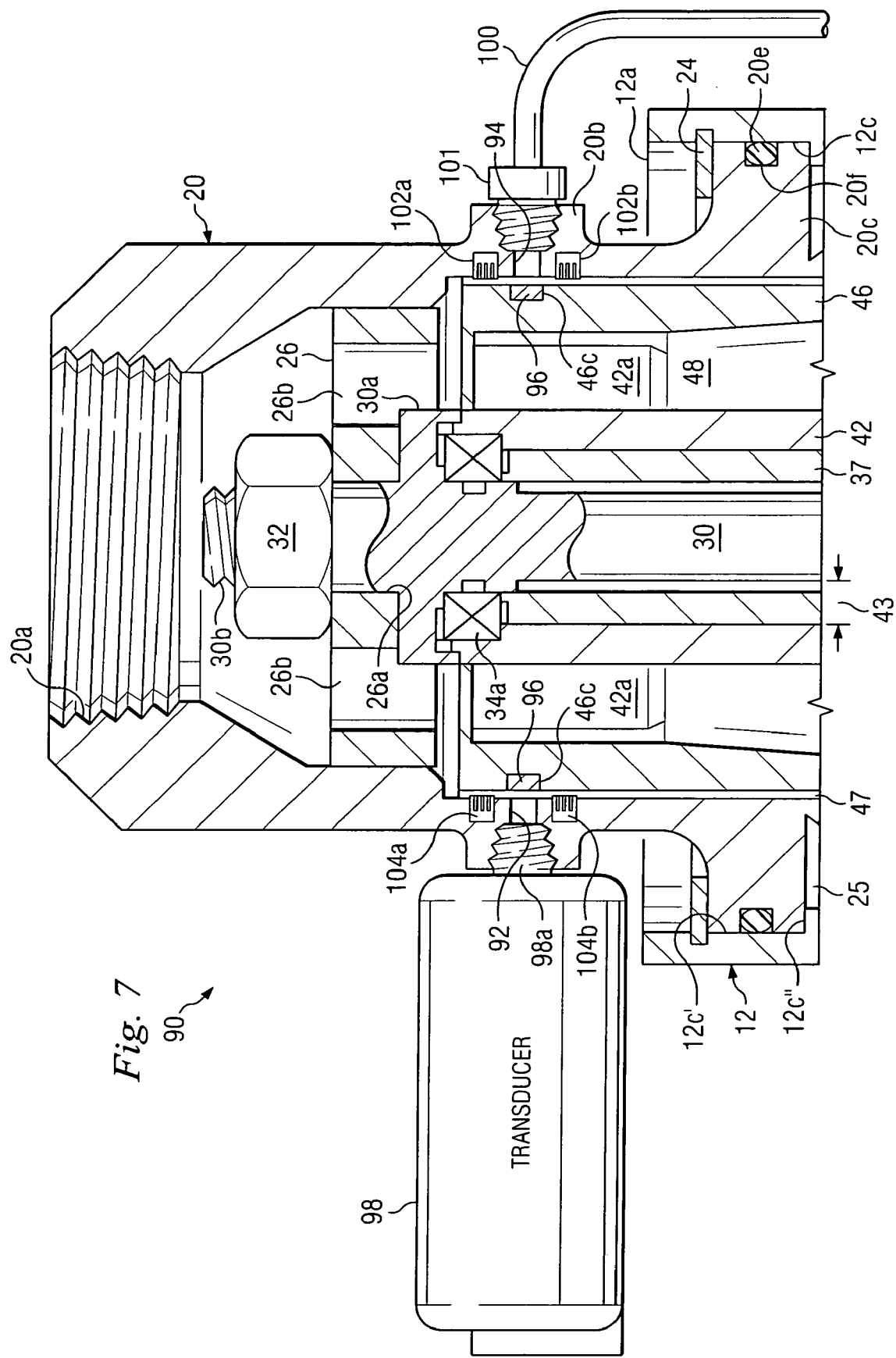
FIG. 7 is a partial elevational/partial sectional view of an enlarged portion of the view shown in FIG. 6.

Referring to FIGS. 6-7, another embodiment of a separator is generally referred to by the reference numeral 90, and is similar to that of FIGS. 1-4 and contains several parts of the embodiment which are given the same reference numerals. In the embodiment of FIGS. 6-7, opposing bores 92 and 94 are formed through the annular ring 20b. The bores 92 and 94 are positioned so that the bores are able to be axially aligned with each hole in the plurality of blind holes 46c under conditions to be described. A ferritic component 96 is disposed in each of the holes in the plurality of blind holes 46c. It is understood that the ferritic components 96 may be in a variety of conventional forms such as, for example, steel set screws.

A transducer 98 having an external-thread connection 98a is connected to the housing 20. The external-thread connection 98a is threadably engaged with the inner wall of the bore 92, and the bore and the external-thread connection are axially aligned. It is understood that a bore (not shown) is formed through the external-thread connection 98a and is able to be axially aligned with each hole in the plurality of blind holes 46c under conditions to be described. The transducer 98 includes one or more magnetic components.

A fluid line 100 is connected to the housing 20 via a fitting 101 that is threadably engaged with the inner wall of the bore 94. The line extends downward alongside the casing 12, turns radially inward below the plate 50, and then extends upward through the plates 50 and 54. An end 100a of the line 100 is positioned near the inlet end 46b of the drum 46, and is offset from the center of the drum. Notwithstanding the extension of the line 100 through the plate 50, it is understood that the interior of the casing 12 remains sealed from the ambient environment due to a conventional sealing engagement between the line and the plate. It is further understood that the position of the end 100a may be varied such as, for example, by moving the end 100a closer towards the center of the drum.

A pair of axially-spaced channels 102a and 102b are formed in the inner wall of the housing 20 so that the bores 92 and 94 are positioned between the channels. Annular labyrinth or drum seals 104a and 104b are disposed in the channels 102a and 102b, respectively. The above-described annular region 47, defined by the outer surface of the drum 46 and the inner surface of the housing 20, is shown in FIG. 7.

In operation, the separator 90 operates generally in a manner similar to that of the separator 10 of the embodiment of FIGS. 1-4. Due in part to the flow resistance associated with the above-described energy transfer between the flow stream and the rotating drum 46 and the blades 42a of the rotor 42, a secondary flow stream of gas may be driven around the outside of the drum. This secondary flow stream then flows through the annular region 47 and past the drum 46, avoiding the viscous drag on the inner surface of the drum and the momentum transfer to the blades 42a.

After passing the drum 46, the secondary flow stream flows through the bores 26b, mixing with the remainder of the gas flow that flowed through the annular region 48. Since the secondary flow stream has not undergone rotary separation in the drum 46, it may be transporting entrained liquid, thereby increasing the possibility of reintroducing liquid back into the gas flow stream flowing through the bores 26b of the support member 26. Thus, re-contaminated gas (or liquid-carrying gas) may be transported downstream of the separator 90 via the pipe section 22, frustrating the purpose of the separator 90.

The seals 49 and 104a limit the flow rate of the secondary flow stream, providing significant flow resistance in light of their proximity to the outer surface of the rotating drum 46. The gas in the secondary flow stream that flows past the seal 104a enters a portion of the annular region 47 that is axially disposed between the seals 104a and 104b. This portion of the annular region 47 has a higher pressure than the pressure at the inlet end 46b of the drum 46 and near the longitudinal center axis of the drum, that is, the pressure in the casing 12 near the end 100a of the line 100. This pressure differential is due, at least in part, to the vortical nature of the flow stream entering the drum 46.

Because of this pressure differential, the secondary gas flow stream flows through the bore 94, the fitting 101 and the line 100, exiting the line at the end 100a for entry into the drum 46. Thus, the secondary flow stream is shunted back into the vortical flow stream entering the drum 46 and flowing through the annular region 48, minimizing the possibility of undesirable mixing between the post-separation gas flow stream exiting the drum and a liquid-transporting secondary flow stream.

As the drum 46 rotates, each ferritic component 96 disposed in the corresponding hole 46c passes the bore 92, and therefore is axially aligned, for a moment, with the bore formed through the external-threaded connection 98a of the transducer 98. The magnetic component of the transducer 98 senses the passing of each ferritic component 96 by the bore 92, thereby measuring the rotational speed of the drum 46. It is understood that the transducer 98 may be configured to measure the rotational speed of the drum 46 via other means such as, for example, conventional optical means.

VARIATIONS

Variations may be made in the foregoing without departing from the scope of the invention. It is understood that each of the above-described embodiments may be combined with one or more of the other embodiments.

For example, the embodiment of FIG. 5 may be combined with that of FIGS. 6-7 so that the resulting separator includes the transducer 98, the plate 86 and the shaft 88. In such a combination, it is understood that the shaft 88 may be actively controlled via the transducer 98. That is, in response to its measurement of the rotational speed of the drum 46, the transducer 98 may send a corresponding signal to a motor controller which, in turn, controls the degree of rotation of the shaft 88. Thus, since the rotational speed of the drum 46 is dependent upon the volumetric flow rate of the gas flow stream, any increase or decrease in the volumetric flow rate is sensed and the nozzle throat area 80 is accordingly automatically adjusted.

For the embodiment of FIG. 5, it is understood that the rotation of the shaft 88, and therefore the nozzle throat area 80, may be controlled by other methods instead of via manual adjustment or operation of the transducer 98. For example, the rotation of the shaft 88 may be actively controlled via a signal generated in response to a measurement of another parameter such as, for example, the pressure drop across the separator 82 or the volumetric flow rate of the flow stream in the pipe section 18. It is further understood that other means may be used to form a converging nozzle having a variable throat area. For example, a plurality of rotatable plates may be installed in the inlet port 14. For another example, a telescoping component may be installed in the inlet port 14, with the nozzle throat area varying according to the degree of telescopic extension and/or retraction.

Further, the bearing assemblies 34a and 34b may operate at a pressure substantially corresponding to the pressure of the gas flow stream, and may be shielded from any contaminants using systems and methods similar to those disclosed in co-pending Application Ser. No. 60/608,296, the disclosure of which is incorporated by reference in its entirety. It is understood that shielding the bearing assemblies 34a and 34b in this manner may require one or more fluid lines extending from the vicinity of the bearing assemblies to one or more liquid reservoirs located outside of the separator 10, 82 or 90.

Still further, it is understood that portions or all of the casing 12, the inlet port 14, the housing 20, the rotor 42 and/or the drum 46 may be in other forms besides tubular members such as, for example, in the form of prismatic structures. Also, the size, quantity and location of the blades 52 may be varied. In addition to a vertical orientation, the separator 10, 82 or 90 may be oriented in other directions such as, for example, horizontally. It is further understood that a variety of in-line connection configurations may be used when installing the separator 10, 82 or 90 in new pipeline and/or retrofit applications.

The above-described liquids may be separated and extracted ahead of flow meters in gas transmission lines. The separator 10, 82 or 90 may also be used to scrub gases at compressor inlets and provide a liquid and gas separator for applications where power recovery is not needed. Other service applications of the separator 10, 82 or 90 include, but are not limited to, gas-compressor suction and discharge applications, gas-metering station liquid and solids removal applications, contactor tower inlet and outlet applications, mobile well-test and proving unit applications, conventional separator outlet applications (with the separator serving as a second-stage scrubber), gas transmission applications, and bottleneck removal applications from, for example, existing scrubbers.

Any spatial references such as, for example, "upper", "lower", "above", "below", "between", "vertical", "horizontal," "angular", "downward," "upward," etc., are for the purpose of illustration only and do not limit the specific orientation or location of the structure described above.

Although only a few exemplary embodiments of this invention have been described in detail above, those skilled in the art will readily appreciate that many other modifications are possible in the exemplary embodiments without materially departing from the novel teachings and advantages of this invention. Accordingly, all such modifications are intended to be included within the scope of this invention as defined in the claims. In the claims, means-plus-function clauses are intended to cover the structures described herein as performing the recited function and not only structural equivalents, but also equivalent structures.

What is claimed is:

1. A separator comprising:
    a drum adapted to rotate to separate substances having relatively high densities from a pressurized flow stream, the drum at least partially defining a flow region through which the flow stream flows;
    a nozzle for maintaining the velocity distribution of the flow stream in the flow region substantially constant when the volumetric flow rate of the flow stream changes; and
    an annular region for separating bulk amounts of the substances from the flow stream before the flow stream enters the flow region in the drum.

2. The separator of claim 1 wherein the nozzle comprises a variable nozzle throat area in fluid communication with the flow region.

3. The separator of claim 2 wherein the nozzle comprises a plate adapted to rotate to vary the nozzle throat area.

4. The separator of claim 3 wherein the means further comprises a shaft connected to the plate wherein rotation of the shaft rotates the plate.

5. The separator of claim 3 wherein the plate rotates in response to the measurement of a parameter.

6. The separator of claim 5 wherein the parameter is selected from the group consisting of the rotational speed of the drum, the pressure drop in the flow stream across the separator, and the volumetric flow rate of the flow stream.

7. The separator of claim 5 further comprising a transducer for measuring the parameter wherein the rotation of the plate is controlled at least in part by a signal generated by the transducer in response to its measurement of the parameter.

8. The separator of claim 1 wherein the means maintains the pressure drop in the flow stream across the separator at a substantially constant value when the volumetric flow rate of the flow stream increases.

9. The separator of claim 1 further comprising a rotor surrounded by the drum and adapted to rotate so that the flow region is defined by an inner surface of the drum rotating at a rotational speed and an outer surface of the rotor rotating at the rotational speed.

10. The separator of claim 1 further comprising means for draining the substances from the separator at a drainage rate substantially corresponding to the amount of the substances separated from the flow stream.

11. The separator of claim 1 further comprising:
    a rotor surrounded by the drum so that the flow region is defined by an inner surface of the drum and an outer surface of the rotor;
    a sleeve disposed in an annular region defined by an outer surface of a shaft surrounded by the rotor, an inner surface of the rotor, and two axially-spaced bearing assemblies through which the shaft extends;
    wherein the sleeve limits the amount of fluid flow across the bearing assemblies when the pressure in the annular region changes.

12. The separator of claim 1 further comprising means for fluidically connecting to the flow region an annular region at least partially defined by an outer surface of the drum.

13. A separator comprising:
    means for separating bulk amounts of substances having relatively high densities from a pressurized flow stream; and
    a drum in fluid communication with the means for receiving the flow stream after the bulk amounts have been separated, the drum adapted to rotate to separate the remaining substances from the flow stream.

14. The separator of claim 13 wherein the rotational speed of the drum is substantially decoupled from the amount of the substances present in the flow stream.

15. The separator of claim 13 wherein the means comprises:
    a housing surrounding at least a portion of the drum;
    a casing having a longitudinal axis and surrounding at least a portion of the housing to define an annular region between the casing and the housing; and
    a nozzle connected to the casing for accelerating and directing the flow stream into the annular region.

16. The separator of claim 15 wherein the nozzle directs at least a portion of the flow stream into the annular region in a direction substantially perpendicular to the longitudinal axis of the casing.

17. The separator of claim 16 wherein the bulk amounts are centrifuged against the inner surface of the casing.

18. The separator of claim 15 wherein the nozzle comprises:
    an inlet port having a longitudinal axis and connected to the casing; and
    an insert disposed in the inlet port.

19. The separator of claim 18 wherein the insert defines a ramp surface and wherein the insert further comprises opposing sides connected to the ramp surface, the opposing sides spaced in a parallel relation and extending longitudinally along the inlet port.

20. The separator of claim 13 further comprising means for draining the substances from the separator at a drainage rate substantially corresponding to the amount of the substances separated from the flow stream.

21. The separator of claim 13 further comprising a rotor surrounded by the drum so that the flow region is defined by an inner surface of the drum rotating at a rotational speed and an outer surface of the rotor rotating at the rotational speed.

22. The separator of claim 13 further comprising:
a rotor surrounded by the drum so that the flow region is defined by an inner surface of the drum and an outer surface of the rotor; and
a sleeve disposed in an annular region defined by an outer surface of a shaft surrounded by the rotor, an inner surface of the rotor, and two axially-spaced bearing assemblies through which the shaft extends;
wherein the sleeve limits the amount of fluid flow across the bearing assemblies when the pressure in the annular region changes.

23. The separator of claim 13 further comprising means for fluidically connecting to the flow region an annular region at least partially defined by an outer surface of the drum.

24. The separator of claim 13 further comprising means for maintaining the velocity distribution of the flow stream in the flow region substantially constant when the volumetric flow rate of the flow stream changes.

25. A separator comprising:
a drum adapted to rotate to separate substances having relatively high densities from a pressurized flow stream, the drum having an inlet end and at least partially defining a flow region through which a flow stream flows;
a housing surrounding at least a portion of the drum and defining an annular region between the drum and the housing; and
a line connected to the housing and extending to the inlet end so that the annular region is in fluid communication with the flow region.

26. The separator of claim 25 wherein at least a portion of an additional flow stream is shunted from the annular region to the flow region via the line.

27. The separator of claim 26 further comprising a pair of axially-spaced seals extending circumferentially about the drum, the spacing between the seals defining a portion of the annular region from which the portion of the additional flow stream is shunted.

28. The separator of claim 25 further comprising a casing surrounding at least a portion of the housing wherein the line extends through the casing.

29. The separator of claim 25 further comprising means for draining the substances from the separator at a drainage rate substantially corresponding to the amount of the substances separated from the flow stream.

30. The separator of claim 25 further comprising a rotor surrounded by the drum so that the flow region is defined by an inner surface of the drum rotating at a rotational speed and an outer surface of the rotor rotating at the rotational speed.

31. The separator of claim 25 further comprising means for separating bulk amounts of the substances from the flow stream before the flow stream enters the flow region in the drum.

32. The separator of claim 25 further comprising means for maintaining the velocity distribution of the flow stream in the flow region substantially constant when the volumetric flow rate of the flow stream changes.

33. A separator comprising:
a drum adapted to rotate to separate substances having relatively high densities from a pressurized flow stream, the drum at least partially defining a flow region through which the flow stream flows;
a casing at least partially surrounding the drum and in which the separated substances collect; and
means for draining the substances from the separator at a drainage rate substantially corresponding to the amount of the substances separated from the flow stream wherein the draining means comprises a protrusion extending within the casing, at least one port formed through the protrusion and fluidically connecting the interior of the casing to the exterior of the casing, and a sleeve slideably engaged with the protrusion.

34. The separator of claim 33 wherein the draining means further comprises means for sliding the sleeve along the protrusion to vary the amount of the port exposed to the collected substances in response to the amount of the collected substances.

35. The separator of claim 33 further comprising a plurality of longitudinally-extending blades circumferentially spaced about the protrusion to limit vortical flow in the casing in the vicinity of the protrusion.

36. The separator of claim 33 further comprising a rotor surrounded by the drum so that the flow region is defined by an inner surface of the drum rotating at a rotational speed and an outer surface of the rotor rotating at the rotational speed.

37. The separator of claim 33 further comprising:
a rotor surrounded by the drum so that the flow region is defined by an inner surface of the drum and an outer surface of the rotor; and
a sleeve disposed in an annular region defined by an outer surface of a shaft surrounded by the rotor, an inner surface of the rotor, and two axially-spaced bearing assemblies through which the shaft extends;
wherein the sleeve limits the amount of fluid flow across the bearing assemblies when the pressure in the annular region changes.

38. The separator of claim 33 further comprising means for maintaining the velocity distribution of the flow stream in the flow region substantially constant when the volumetric flow rate of the flow stream changes.

39. The separator of claim 33 further comprising means for separating bulk amounts of the substances from the flow stream before the flow stream enters the flow region in the drum.

40. A separator comprising:
a drum adapted to rotate to separate substances having relatively high densities from a pressurized flow stream; and
a rotor adapted to rotate and surrounded by the drum so that the flow stream flows through a flow region in the drum defined by a rotating inner surface of the drum and a rotating outer surface of the rotor.

41. The separator of claim 40 further comprising a plurality of blades connecting the rotor to the drum wherein the inner surface of the drum rotates at a rotational speed and the outer surface of the rotor rotates at the rotational speed.

42. The separator of claim 40 further comprising a shaft surrounded by the rotor.

43. The separator of claim 42 further comprising two axially-spaced bearing assemblies through which the shaft extends wherein an annular region is defined by an outer surface of the shaft, an inner surface of the rotor, and the bearing assemblies.

44. The separator of claim 43 further comprising a sleeve disposed in the annular region to limit the amount of fluid flow across the bearing assemblies when the pressure in the annular region changes.

45. The separator of claim 42 wherein the shaft remains stationary during the rotation of the rotor.

46. The separator of claim 40 further comprising means for maintaining the velocity distribution of the flow stream in the flow region substantially constant when the volumetric flow rate of the flow stream changes.

47. The separator of claim 40 further comprising means for separating bulk amounts of the substances from the flow stream before the flow stream enters the flow region in the drum.

48. The separator of claim 40 further comprising means for draining the substances from the separator at a drainage rate substantially corresponding to the amount of the substances separated from the flow stream.

49. The separator of claim 40 further comprising means for fluidically connecting to the flow region an annular region at least partially defined by an outer surface of the drum.

50. A separator comprising:
a rotor adapted to rotate to separate substances having relatively high densities from a pressurized flow stream;
a shaft surrounded by the rotor;
two axially-spaced bearing assemblies through which the shaft extends wherein an annular region is defined by an outer surface of the shaft, an inner surface of the rotor, and the bearing assemblies; and
a sleeve disposed in the annular region to limit the amount of fluid flow across the bearing assemblies when the pressure in the annular region changes.

51. The separator of claim 50 further comprising a drum surrounding the rotor.

52. The separator of claim 51 wherein a flow region through which the flow stream flows is defined by an inner surface of the drum and an outer surface of the rotor.

53. The separator of claim 52 wherein the inner surface of the drum rotates at a rotational speed and the outer surface of the rotor rotates at the rotational speed.

54. The separator of claim 52 further comprising means for maintaining the velocity distribution of the flow stream in the flow region substantially constant when the volumetric flow rate of the flow stream changes.

55. The separator of claim 52 further comprising means for separating bulk amounts of the substances from the flow stream before the flow stream enters the flow region in the drum.

56. The separator of claim 52 further comprising means for draining the substances from the separator at a drainage rate substantially corresponding to the amount of the substances separated from the flow stream.

57. A separator comprising:
a drum adapted to rotate to separate substances having relatively high densities from a pressurized flow stream, the drum at least partially defining a flow region through which the flow stream flows; and
means wherein bulk amounts of the substances are separated from the flow stream before the flow stream enters the flow region in the drum for substantially decoupling the rotational speed of the drum from the amount of the substances present in the flow stream.

58. The separator of claim 57 further comprising means for draining the substances from the separator at a drainage rate substantially corresponding to the amount of the substances separated from the flow stream.

59. The separator of claim 57 further comprising a rotor surrounded by the drum so that the flow region is defined by an inner surface of the drum rotating at a rotational speed and an outer surface of the rotor rotating at the rotational speed.

60. The separator of claim 57 further comprising means for maintaining the velocity distribution of the flow stream in the flow region substantially constant when the volumetric flow rate of the flow stream changes.

61. A separator comprising:
means for separating bulk amounts of substances having relatively high densities from a pressurized flow stream;
a drum in fluid communication with the means for receiving the flow stream after the bulk amounts have been separated, the drum adapted to rotate to separate the remaining substances from the flow stream;
a rotor adapted to rotate and surrounded by the drum so that the flow stream flows through a flow region in the drum defined by a rotating inner surface of the drum and a rotating outer surface of the rotor; and
means for draining the substances from the separator at a drainage rate substantially corresponding to the amount of the substances separated from the flow stream.

62. The separator of claim 61 further comprising means for maintaining the velocity distribution of the flow stream in the flow region substantially constant when the volumetric flow rate of the flow stream changes.

63. The separator of claim 61 further comprising a sleeve disposed in an annular region defined by an outer surface of a shaft surrounded by the rotor, an inner surface of the rotor, and two axially-spaced bearing assemblies through which the shaft extends;
wherein the sleeve limits the amount of fluid flow across the bearing assemblies when the pressure in the annular region changes.

64. The separator of claim 61 further comprising means for fluidically connecting to the flow region an annular region at least partially defined by the outer surface of the drum.

65. A method comprising:
separating substances having relatively high densities from a pressurized flow stream by permitting the flow stream to flow through a flow region at least partially defined by a rotating drum;
separating bulk amounts of the substances before the flow stream enters a flow region within the rotating drum; and
maintaining the velocity distribution of the flow stream in the flow region substantially constant when the volumetric flow rate of the flow stream changes.

66. The method of claim 65 wherein the step of maintaining comprises:
fluidically connecting to the flow region a nozzle having a throat area; and
varying the throat area of the nozzle.

67. The method of claim 66 wherein the step of varying comprises rotating a plate.

68. The method of claim 67 wherein the step of varying further comprises:
measuring a parameter; and
generating a signal in response to the parameter measurement to control the rotation of the plate.

69. The method of claim 68 wherein the parameter is the rotational speed of the drum.

70. The method of claim 65 further comprising separating bulk amounts of the substances from the flow stream before the flow stream enters the flow region in the drum.

71. The method of claim 65 wherein the flow region is defined by an inner surface of the drum rotating at a rotational speed and an outer surface of a rotor surrounded by the drum and rotating at the rotational speed.

72. The method of claim 65 further comprising collecting the separated substances in a casing at least partially surrounding the drum and draining the substances from the casing at a drainage rate substantially corresponding to the amount of the substances separated from the flow stream.

73. The method of claim 65 further comprising shunting to the flow region an additional flow stream flowing over an outer surface of the drum.

74. A method comprising:
separating substances having relatively high densities from a pressurized flow stream by permitting the flow stream to flow through a flow region at least partially defined by a rotating drum; and
substantially decoupling the rotational speed of the drum from the amount of the substances present in the flow stream by separating bulk amounts of the substances from the flow stream before the flow stream enters the flow region in the drum.

75. The method of claim 74 further comprising:
collecting the separated substances in a casing at least partially surrounding the drum; and
draining the substances from the casing at a drainage rate substantially corresponding to the amount of the substances separated from the flow stream.

76. The method of claim 74 further comprising fluidically connecting to the flow region an annular region at least partially defined by an outer surface of the drum.

77. The method of claim 74 further comprising maintaining the velocity distribution of the flow stream in the flow region substantially constant when the volumetric flow rate of the flow stream changes.

78. A method comprising:
separating bulk amounts of substances having relatively high densities from a pressurized flow stream; and
separating the remaining substances from the flow stream by permitting the flow stream to flow through a flow region at least partially defined by a rotating drum after the bulk amounts have been separated.

79. The method of claim 78 wherein the rotational speed of the drum is substantially decoupled from the amount of the substances present in the flow stream.

80. The method of claim 78 further comprising connecting a rotor to the drum so that the flow region is defined by a rotating inner surface of the drum and a rotating outer surface of the rotor.

81. The method of claim 80 further comprising disposing a sleeve in an annular region defined by an outer surface of a shaft surrounded by the rotor, an inner surface of the rotor, and two axially-spaced bearing assemblies through which the shaft extends.

82. The method of claim 81 wherein the sleeve limits the amount of fluid flow across the bearing assemblies when the pressure in the annular region changes.

83. A method comprising:
separating substances having relatively high densities from a pressurized flow stream by permitting the flow stream to flow through a flow region at least partially defined by a rotating drum that is at least partially surrounded by a casing;
separating bulk amounts of the substances from the flow stream before the flow stream enters the flow region in the drum; and
draining the substances from the casing at a drainage rate substantially corresponding to the amount of the substances separated from the flow stream.

84. The method of claim 83 further comprising connecting a rotor to the drum so that the flow region is defined by a rotating inner surface of the drum and a rotating outer surface of the rotor.

85. The method of claim 83 further comprising maintaining the velocity distribution of the flow stream in the flow region substantially constant when the volumetric flow rate of the flow stream changes.

86. The method of claim 83 further comprising disposing a sleeve in an annular region defined by an outer surface of a shaft surrounded by the rotor, an inner surface of the rotor, and two axially-spaced bearing assemblies through which the shaft extends;
wherein the sleeve limits the amount of fluid flow across the bearing assemblies when the pressure in the annular region changes.

87. A method comprising:
separating substances having relatively high densities from a pressurized flow stream by permitting the flow stream to flow through a flow region at least partially defined by a rotating drum; and
connecting a rotor to the drum so that the flow region is defined by a rotating inner surface of the drum and a rotating outer surface of the rotor.

88. The method of claim 87 further comprising disposing a sleeve in an annular region defined by an outer surface of a shaft surrounded by the rotor, an inner surface of the rotor, and two axially-spaced bearing assemblies through which the shaft extends;
wherein the sleeve limits the amount of fluid flow across the bearing assemblies when the pressure in the annular region changes.

89. The method of claim 87 further comprising fluidically connecting to the flow region an annular region at least partially defined by an outer surface of the drum.

90. A method comprising:
separating substances having relatively high densities from a pressurized flow stream by permitting the flow stream to flow through a flow region at least partially defined by a rotating drum that surrounds a rotor; and
disposing a sleeve in an annular region defined by an outer surface of a shaft surrounded by the rotor, an inner surface of the rotor, and two axially-spaced bearing assemblies through which the shaft extends;
wherein the sleeve limits the amount of fluid flow across the bearing assemblies when the pressure in the annular region changes.

91. The method of claim 90 further comprising fluidically connecting to the flow region another annular region at least partially defined by an outer surface of the drum.

92. The method of claim 90 further comprising maintaining the velocity distribution of the flow stream in the flow region substantially constant when the volumetric flow rate of the flow stream changes.

93. The method of claim 90 further comprising:
collecting the separated substances in a casing at least partially surrounding the drum; and
draining the substances from the casing at a drainage rate substantially corresponding to the amount of the substances separated from the flow stream.

94. The method of claim 90 further comprising substantially decoupling the rotational speed of the drum from the amount of the substances present in the flow stream.

95. A method comprising:
separating substances having relatively high densities from a pressurized flow stream by permitting the flow stream to flow through a flow region at least partially defined by a rotating drum;
surrounding at least a portion of the drum with a housing to define an annular region between the drum and the housing;
connecting a line to the housing; and
positioning the distal end of the line in the vicinity of the drum so that the annular region is in fluid communication with the flow region.

96. The method of claim 95 further comprising shunting at least a portion of an additional flow stream to the flow region via the line.

97. The method of claim 95 further comprising separating bulk amounts of the substances from the flow stream before the flow stream enters the flow region in the drum.

98. The method of claim 95 further comprising
collecting the separated substances in a casing at least partially surrounding the housing; and
draining the substances from the casing at a drainage rate substantially corresponding to the amount of the substances separated from the flow stream.

99. The method of claim 95 further comprising maintaining the velocity distribution of the flow stream in the flow region substantially constant when the volumetric flow rate of the flow stream changes.

* * * * *